United States Patent
Pasula et al.

(10) Patent No.: US 11,017,227 B2
(45) Date of Patent: *May 25, 2021

(54) CREATING AN IRIS IDENTIFIER TO REDUCE SEARCH SPACE OF A BIOMETRIC SYSTEM

(71) Applicant: Advanced New Technologies Co., Ltd., Grand Cayman (KY)

(72) Inventors: Raghunandan Pasula, Hangzhou (CN); Gregory Lee Storm, Hangzhou (CN); Reza R. Derakhshani, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,162

(22) Filed: Nov. 9, 2020

(65) Prior Publication Data

US 2021/0081644 A1    Mar. 18, 2021

Related U.S. Application Data

(63) Continuation of application No. 16/224,479, filed on Dec. 18, 2018, now Pat. No. 10,832,053.

(51) Int. Cl.
*G06K 9/00* (2006.01)
*G06T 9/00* (2006.01)
*G06T 7/00* (2017.01)

(52) U.S. Cl.
CPC ....... *G06K 9/0061* (2013.01); *G06K 9/00617* (2013.01); *G06T 7/0014* (2013.01); *G06T 9/00* (2013.01); *G06T 2207/30041* (2013.01)

(58) Field of Classification Search
CPC ............ G06K 9/0061; G06K 9/00617; G06K 9/00597; G06T 9/00; G06T 7/0014; G06T 2207/30041
See application file for complete search history.

(56) References Cited

U.S. PATENT DOCUMENTS

| | | | | |
|---|---|---|---|---|
| 5,291,560 A | * | 3/1994 | Daugman | G06K 9/00906 382/117 |
| 2015/0098630 A1 | | 4/2015 | Perna et al. | |

(Continued)

FOREIGN PATENT DOCUMENTS

RU    2628201    8/2017

OTHER PUBLICATIONS

High Confidence Visual Recognition of Person by a Test of Statistical Independence (Year: 2013).*

(Continued)

*Primary Examiner* — Nizar N Sivji
(74) *Attorney, Agent, or Firm* — Fish & Richardson P.C.

(57) ABSTRACT

The technology described in this document can be embodied in a method for generating an iris identifier. The method includes obtaining a plurality of images of an iris, and generating a binary code for each of the plurality of images of the iris, the binary code including a sequence of bits. The method also includes identifying a first pattern of bits for which bit values and bit-locations are the same across a plurality of the binary codes, generating a first index based on the first pattern of bits, and then storing the first index on a storage device in accordance with a database management system. The first index is linked to biometric information of a different modality for a corresponding user.

12 Claims, 5 Drawing Sheets

(56) References Cited

U.S. PATENT DOCUMENTS

| 2018/0018516 A1 | 1/2018 | Odinokikh et al. |
| 2018/0276467 A1 | 9/2018 | Kaehler |
| 2018/0349683 A1 | 12/2018 | Mathieu |

OTHER PUBLICATIONS

How Iris recognition works (Year: 2004).*
Gyaourova et al., "Index Codes for Multibiometric Pattern Retrieval," IEEE Transactions on Information Forensic and Security, Apr. 2012, 7(2):518-529.
Elsafi et al., "Iris Identification Based on Log Gabor Filtering," Midwest Symposium on Circuits and Systems, Jan. 2004, 1:333-336.
Gadde et al., "Indexing Iris Images Using the Burrows-Wheeler Transform," 2010 IEEE International Workshop on Information Forensics and Security (WIFS), Jan. 2011, pp. 1-6.
Hudon et al., "High Speed Sequential Illumination with Electronic Rolling Shutter Camers," CVPR Workshops, Jun. 2015, pp. 66-73.
Kahlil et al., "Generation of Iris Codes Using 1D Log-Gabor Filter," The 2010 International Conference on Computer Engineering & Systems, Nov. 2010, pp. 329-336.
Kanade et al., "Obtaining Cryptographic Keys Using Feature Level Fusion of Iris and Face Biometrics for Secure User Authentication," 2010 IEEE Computer Society Conference on Computer Vision and Patter Recognition Workshops (CVPRW), Jun. 2010, pp. 138-145.
Mukherjee, "Indexing techniques for fifingerprint and iris databases," West Virginia University Graduate Theses, Dissertations, and Problem Report, 2007, pp. 1-90.
Nigam et al., "Ocular Biometrics: A survey of modalities and fusion approaches," Information Fusion, Apr. 2015, 26:1-35.
PCT International Search Report and Written Opinion in International Application No. PCT/US2019/065727, dated Apr. 23, 2020, 16 pages.
Rathgeb et al., "Context-based biometric key generation for Iris," IET Computer Vision, Nov. 2011, 5(6):389-397.
Tsai et al., "Iris recognition using Gabor filters optimized by the particle swarm technique," IEEE International Conference on Systems, Man and Cybernetics, Nov. 2008, pp. 921-926.

* cited by examiner

CREATING AN IRIS IDENTIFIER TO REDUCE SEARCH SPACE OF A BIOMETRIC SYSTEM

PRIORITY CLAIM

This application is a continuation of and claims the benefit of priority of U.S. patent application Ser. No. 16/224,479, filed Dec. 18, 2018, which is hereby incorporated by reference in its entirety.

TECHNICAL FIELD

This disclosure relates to biometric authentication systems.

BACKGROUND

Systems incorporating a biometric identification technology such as iris recognition captures information from a user and processes such information to authenticate the user using the biometric identification technology.

SUMMARY

In one aspect, this document features a method for generating an iris identifier. The method includes obtaining a plurality of images of an iris and generating a binary code for each of the plurality of images of the iris, the binary code including a sequence of bits. The method also includes identifying a first pattern of bits for which bit values and bit-locations are the same across a plurality of the binary codes, and generating a first index based on the first pattern of bits, and storing the first index on a storage device in accordance with a database management system. The first index is linked to biometric information of a different modality for a corresponding user.

In another aspect, this document features a system that includes at least one processing device and a memory communicatively coupled to the at least one processing device. The memory stores instructions which, when executed, cause the at least one processing device to perform operations that include obtaining a plurality of images of an iris and generating a binary code for each of the plurality of images of the iris, the binary code including a sequence of bits. The operations also include identifying a first pattern of bits for which bit values and bit-locations are the same across a plurality of the binary codes and generating a first index based on the first pattern of bits. The operations also include storing the first index on a storage device in accordance with a database management system, the first index linked to biometric information of a different modality for a corresponding user.

In another aspect, this document features a system that includes a non-transitory computer-readable medium having encoded thereon computer-readable instructions for causing one or more processing devices to perform operations that include obtaining a plurality of images of an iris and generating a binary code for each of the plurality of images of the iris, the binary code including a sequence of bits. The operations also include identifying a first pattern of bits for which bit values and bit-locations are the same across a plurality of the binary codes, and generating a first index based on the first pattern of bits. The operations also include storing the first index on a storage device in accordance with a database management system, the first index linked to biometric information of a different modality for a corresponding user.

Implementations of the above aspects can include one or more of the following features. Obtaining the plurality of images of the iris can include capturing a first image of the iris and then generating the plurality of images by processing the first image by multiple different filters that simulate various image capture conditions. Generating the binary code can include filtering the image using a Gabor filter. Generating the index can include combining the first pattern of bits together with location information corresponding to the pattern of bits. The biometric information of the different modality and include one of a facial image, a fingerprint image, or an eyeprint image.

The method or operations described above can further include steps for authenticating or authorizing a user. The method or operations can include capturing at least one iris image from a user attempting to access a secure system, and generating, from the at least one iris image, multiple binary codes. The method or operations also include identifying a second pattern of bits in the binary codes for which bit values and bit-locations are the same across the multiple binary codes generated from the at least one iris image, generating a second index based on the second pattern of bits, determining that the second index is substantially similar to the first index, and in response, retrieving the biometric information of the different modality linked to the first index. The method or operations also include obtaining, from the user attempting to access the secure system, biometric information of the different modality, and granting access to the secure system responsive to determining that the biometric information obtained from the user attempting to access the secure system is substantially the same as the biometric information of the different modality linked to the first index.

Various implementations described herein may provide one or more of the following advantages. Creating an iris identifier based on a binary code associated with the iris can significantly reduce the amount of data that a secured device has to process to authenticate users. This may be particularly advantageous for secured devices with limited processing/communication/storage resources. Such system may improve the user experience by increasing the speed and accuracy of authentication and adding a security layer to additional biometric authentication methods. Other advantages include reducing a search space in a different biometric modality without storing iris images, which may be prohibited in some jurisdictions for regulatory reasons.

Figure 1:
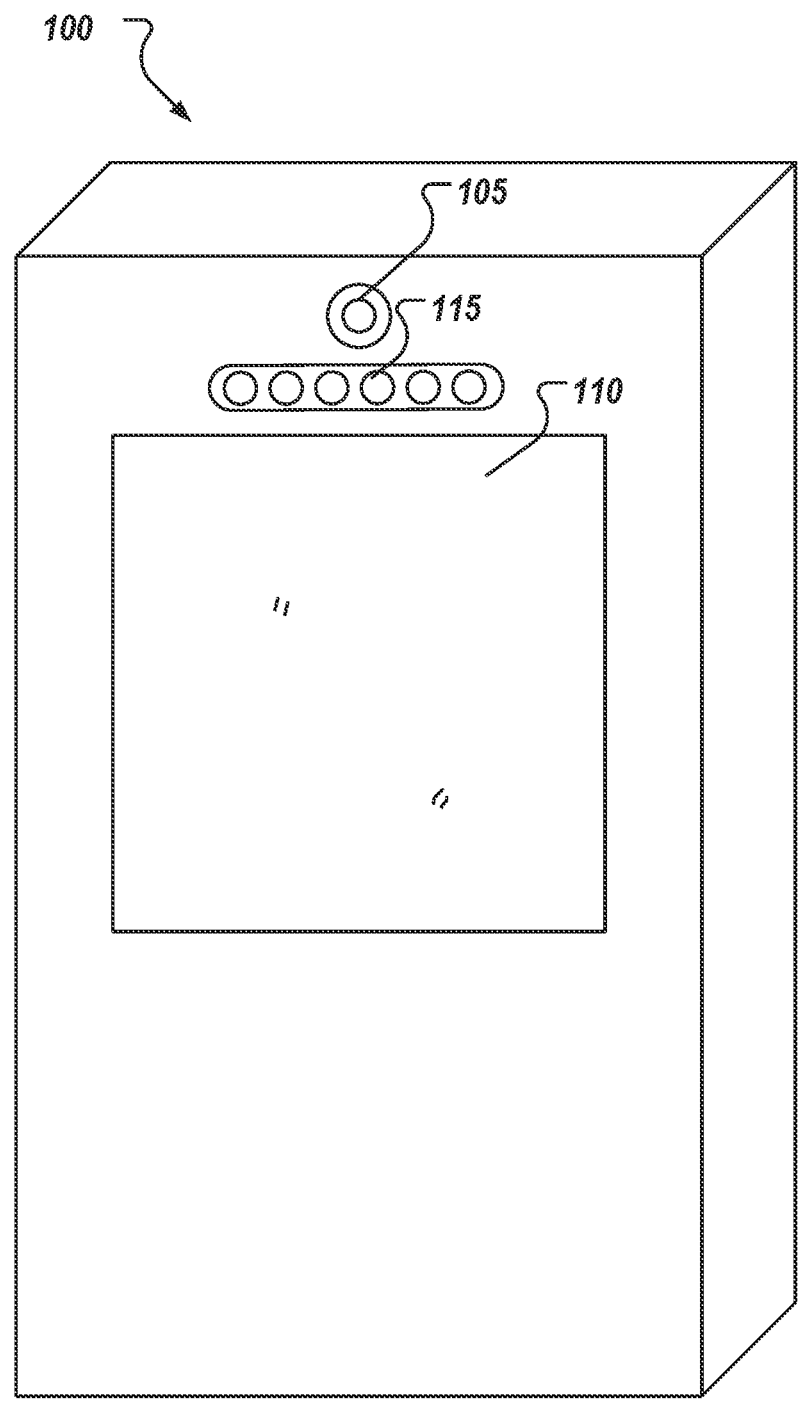
FIG. 1 shows a kiosk machine as an example environment in which the technology described herein may be used.

Repeat use of reference characters in the present specification and drawings is intended to represent same or analogous features or elements.

DETAILED DESCRIPTION

This document describes technology that creates an iris identifier from an iris image to reduce the search space of a biometric authentication system. Various biometric identification/verification systems are based on gathering or capturing information from a user such as iris images, which are then compared to template information previously stored during an enrollment process. For example, a biometric authentication system that uses face identification may require enrolling users to pose for one or more images of their face or eyes during an enrollment process. The images captured during the enrollment process may be stored on a storage device accessible to the biometric authentication system. During run-time, an iris image of a user can be captured and compared with previously-stored template images of multiple users to find a matching picture and determine if the user may be authenticated. The memory or storage devices of biometric authentication systems often store very large gallery sizes, storing hundreds, thousands, tens of thousands, millions, or even more images of different users. To authenticate a user, the biometric authentication system often compares a run-time image of a user with several if not all of the stored images to find a matching image. Such gallery sizes or search spaces can slow down the authentication process and may require significant computational resources which translates into high power consumptions.

The human iris is the annular structure located between the central pupil region and the white sclera region. Irises have complex fiber-like structures that may be binarized and encoded to generate templates usable in biometric authentication techniques. While portions of the iris remain stable across time and imaging conditions, and therefore reliably usable in biometric authentication, storing of IrisCodes as templates may be highly regulated in some jurisdictions. The technology described herein leverages identifying stable portions in human irises, and using the code corresponding to such portions as indices to biometric information of other modalities. For example, the codes (also referred to a "stable bits") corresponding to such stable portions of the iris can be linked to biometric information of a different modality (e.g., face image) of the corresponding user during the enrolment process. During runtime, the iris image(s) of a user can be processed to identify the stable bits to generate an index, which in turn may be used to retrieve other biometric templates (e.g., template face images) linked to the same index. Because the number of candidate templates linked to the same index is likely to be significantly less than the number of templates in the full search space, the indexing process using the stable bits of irises can improve the performance of a biometric authentication system, for example, by allowing for a quicker identification of a user.

In one example application, during an enrollment process, a computing device such as a secured device (e.g., a kiosk device) or a mobile device uses an image sensor to capture multiple iris images of the user. The computing device, after unwrapping and filtering the iris images, generates a binary code for each iris image. Each binary code is based on pixels of a respective image of the iris and includes a sequence of bits. The computing device identifies 'stable bits' from the sequence of bits by identifying a pattern of bits for which the value and locations in the corresponding sequence of bits are the same across all or some of the multiple binary codes. The computing device generates an iris identifier based on the pattern of bits and stores the iris identifier linked to the user in a storage device such that the iris identifier can be used by a biometric authentication system. For example, during run-time, when a user attempts to access a secured device, the secured device uses an image sensor to capture multiple iris images of the user and generates a binary code for each iris image similar to the method used during the enrollment process. As during the enrollment process, the secured device identifies stable bits, generates an identifier based on the stable bits, and retrieves, from the storage device using a database management system, identification of one or more candidate users that are linked to substantially the same identifier. The secured device can then identify the person as one of the candidate users. Such a verification system may significantly reduce the amount of data that the secured device has to process to authenticate users. This may be particularly advantageous for secured devices with limited processing/communication/storage resources. Such system may improve the user experience by increasing the speed and accuracy of authentication and adding a security layer to additional biometric authentication methods. In addition, the technology can be used to leverage reduction of search space in a different biometric modality without storing iris images, which may be prohibited in some jurisdictions for regulatory reasons.

FIG. 1A shows a kiosk machine 100 as an example environment in which the technology described herein may be used. Such kiosk machines may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user. Additionally, as described in more detail below with respect to FIG. 1B, the technology described herein may be deployed on a different environment that uses biometric authentication, such as rental bicycles or scooters, car doors, or house doors.

The kiosk 100 includes one or more components that support a biometric authentication system. For example, the kiosk 100 can include one or more illumination sources 115 and a camera 105 that captures images of users interacting with the kiosk 100. The illumination source 115 may include a high-intensity illumination source (e.g., LED light) that illuminates the user to allow the camera to capture high-quality images of the iris. In some implementations, the illumination source may include an infrared (IR) illumination source that generates electromagnetic radiation in the IR or near-IR wavelength range, and the camera can be configured to capture images of objects reflecting infrared light. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify a pre-stored profile for the user, and the payment for the food may then be automatically deducted from an account linked to the profile.

In some implementations, the images captured using the camera 105 can be processed using an underlying biometric authentication system to identify/authenticate the user. In some implementations, the biometric authentication system may extract from the images various features-such as features derived from the face, iris, vasculature underlying the sclera of the eye, or the periocular region-to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

Figure 2A:
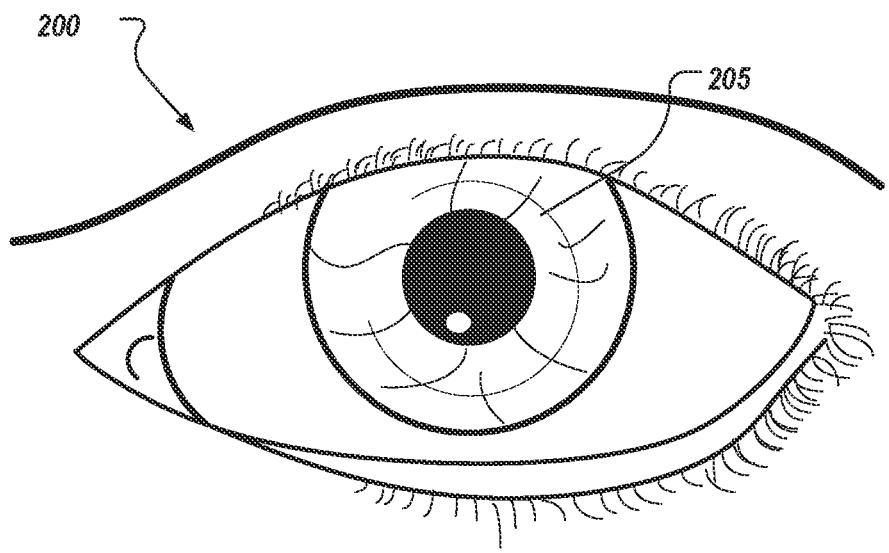
FIG. 2A shows an example of an image of an eye captured using the technology described herein.
Figure 2B:
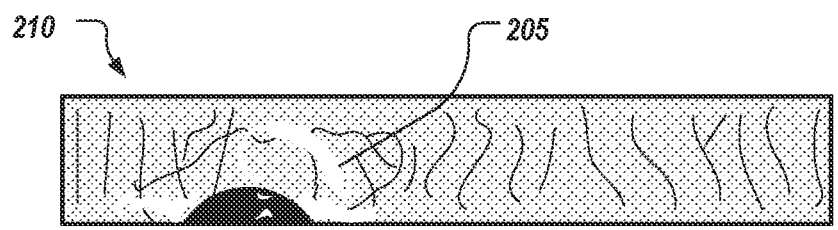
FIG. 2B shows an example of an unwrapped image of an iris extracted from the eye image from FIG. 2A.
Figure 2C:
FIG. 2C shows an example of a binarized image of the iris from FIG. 2B.

Referring to FIGS. 2A-2C, an example process for generating an iris identifier includes capturing and binarizing an image of an iris to generate a code therefrom. For example, FIG. 2A shows one image 200 of a plurality of images captured during an enrollment process. In some examples, the multiple images can be captured over multiple sessions or interactions of a user with a corresponding device. In some implementations, an iris image can be processed using different filters to simulate various image capture conditions. In FIG. 2A, the image 200 is a picture of an eye captured for an enrolling user. The image 200 may be an IR image or an image taken with enough illumination to capture a detailed image of the iris 205. FIG. 2B shows an unwrapped image of the iris. For example, a computing device (e.g., a processing device) of the secured device can cut and extract a portion of the annular iris 205 from the image 200, to be unwrapped into a rectangular image 210. In some implementations, multiple unwrapped iris images can be used to generate corresponding binary codes having the same dimensions (e.g., the same length or the same length×width) across the multiple images. In some implementations, the unwrapped image 210 can be filtered prior to binarizing in order to generate the IrisCode. Filters that can be used include, for example, Gabor filters, wavelet-based filters, and discrete cosine transform (DCT) based filters. As shown in FIG. 2C, the filtered image can be binarized to generate a binary image 220, which is then used to generate the IrisCode. In some implementations, one or more image processing techniques such as segmentation, thresholding, or dithering can be performed on the iris images in the process of generating the binary image.

Figure 3:
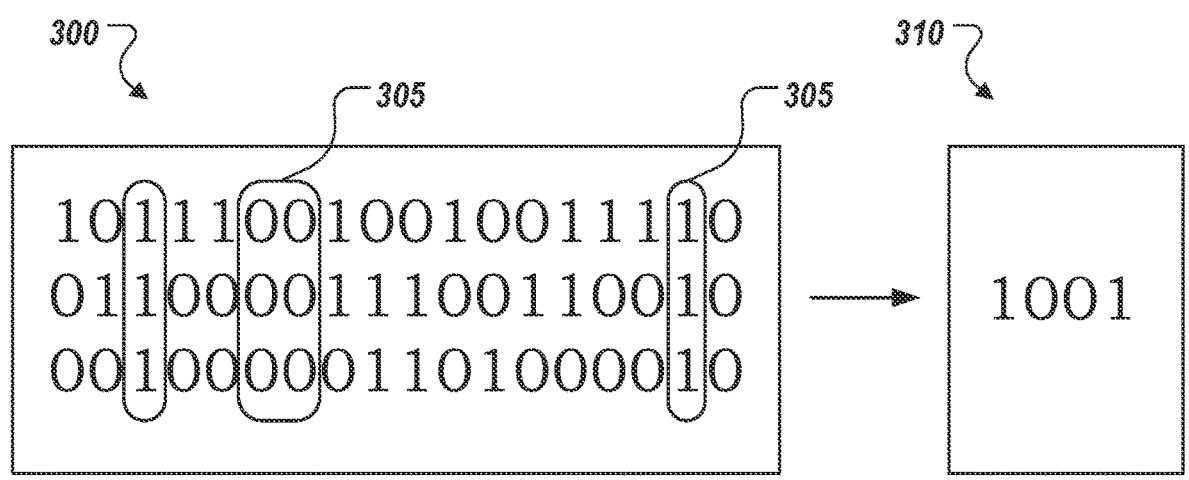
FIG. 3 is diagram of an example process for generating an iris identifier.

The binary image 220 can be used to generate a corresponding IrisCode. For example, each bit in the generated binary code can be associated with a specific pixel value of the binary image. The binary code includes a sequence or array of bits that can be analyzed or compared with other binary codes generated based on the other captured images of the iris, to identify 'stable bits'. For example, as shown in FIG. 3, three different binary codes 300 (each code containing 18 bits for simplicity purposes) are extracted from three different iris images of the same user. Each code is different because the pixels of each captured image vary from picture to picture depending on lighting conditions, noise, etc. The three codes are then compared to one another to identify a pattern of bits for which the values and locations in the corresponding sequence of bits are the same across all three binary codes 300. As shown in FIG. 3, the multiple bits from the binary codes form 'groups' 305 of bits that have the same value and location across the binary codes. The bits in these groups are referred to herein as stable bits. In some implementations, information about the stable bits of such groups 305, together with the location information of such groups can be combined to generate a single code 310 (e.g., a cluster of stable bits) that can be used as an index associated with biometric information corresponding to another modality for the same user. A database management system (not shown) can store such indices linked to information on another biometric modality for multiple other users, wherein each of the indices is generated for a corresponding user. While IrisCodes in their entireties can be unique to users, the representations derived from shorter codes corresponding to the stable bits are typically not. Therefore, substantially similar or equal indexes formed based on such stable bits can be grouped or clustered together to form search spaces of reduced dimensions (as compared to a full search space of templates of another biometric modality) that a biometric authentication system can use to search for a matching template.

In some examples, each index generated based on identifying stable bits can be associated with a template of another modality (e.g., a facial image, a fingerprint image, an eyeprint image etc.). During run time, an index can be generated by identifying stable bits from multiple iris images, and the index can be used to retrieve the multiple template images linked to the same index in the database. The retrieved template images are compared with a run-time image (of the other modality) of the user captured during the authentication process. Because the number of retrieved template images linked to the particular index can be significantly less than the total number of templates, the technology described herein can improve the speed of the authentication process by reducing the search space. In some implementations, multiple images of the iris can be captured over time (e.g., as the user continues to interact with the secured device) to be iteratively processed and updated to 'strengthen' the index of the user by adding more 'layers' of stable bits to the iris identifier. In some implementations, advantages of the search-space reduction as facilitated by the technology described herein can be quantified using metrics such as penetration rate and hit rate. A penetration rate represents the portion of total images searched in order to find a match. A hit rate represents the percentage of times the correct matching template was found in that penetration rate. In some implementations, the technology described herein can help decrease the penetration rate, and/or increase the hit rate, thereby improving the efficiency of the overall search process.

Figure 4:
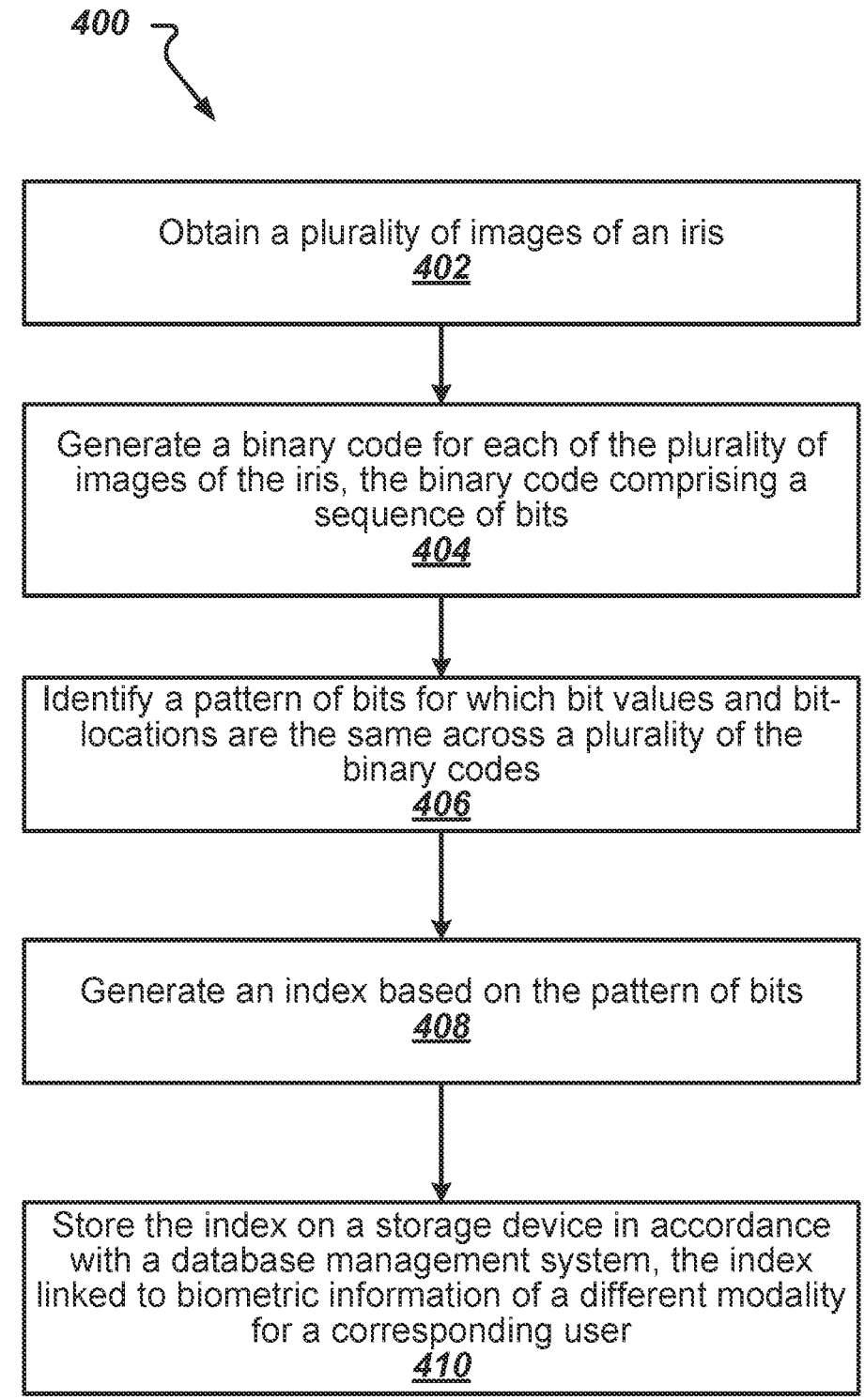
FIG. 4 is a flowchart of an example process for creating an iris identifier to reduce search space of a biometric authentication system.

FIG. 4 is a flowchart of an example process 400 for generating a template of an iris. The method includes obtaining a plurality of images of an iris (402). The images can be obtained by capturing the images of the iris with an image sensor such as a sensor of a camera. The plurality of images may be captured in one interaction or multiple interactions of a user with a computing device such as a phone or a kiosk device. The process further includes generating a binary code for each of the plurality of images of the iris, the binary code including a sequence of bits (404). In some examples, the binary code can be generated by first unwrapping the image of the iris and then filtering the unwrapped image of the iris. The image can be filtered using a Gabor filter. The filtered image can be binarized to generate a binary code of the image. In some cases, a separate code can be generated by using different filters on the same image to simulate various image capture conditions. The method further includes identifying a first pattern of bits for which bit values and bit-locations are the same across a plurality of the binary codes (406). In some examples, the bits that form the first pattern of bits are considered stable bits. Stable bits may also include bits that are constantly above a threshold of pixel intensity or value across all or multiple images of the iris. The process 400 further includes the steps of generating a first index based on the first pattern of bits (408), and then storing the first index on a storage device in accordance with a database management system, the first index linked to biometric information of a different modality for a corresponding user (410). Generating the index can include combining the first pattern of bits together with location information corresponding to the pattern of bits. The biometric information of the different modality can include one of a facial image, a fingerprint image, or an eyeprint image.

After the first index has been stored, a process of identifying or authenticating a user may include the steps of capturing at least one iris image from a user attempting to access a secure system and generating, from the at least one iris image, multiple binary codes. The process can include identifying a second pattern of bits in the binary codes for which bit values and bit-locations are the same across the multiple binary codes generated from the at least one iris image, and generating a second index based on the second pattern of bits. The method can include determining that the second index is substantially similar to the first index and, in response, retrieving the biometric information of the different modality linked to the first index. The method can include obtaining, from the user attempting to access the secure system, biometric information of the different modality, and then granting access to the secure system responsive to determining that the biometric information obtained from the user attempting to access the secure system is substantially same as the biometric information of the different modality linked to the first index.

Figure 5:
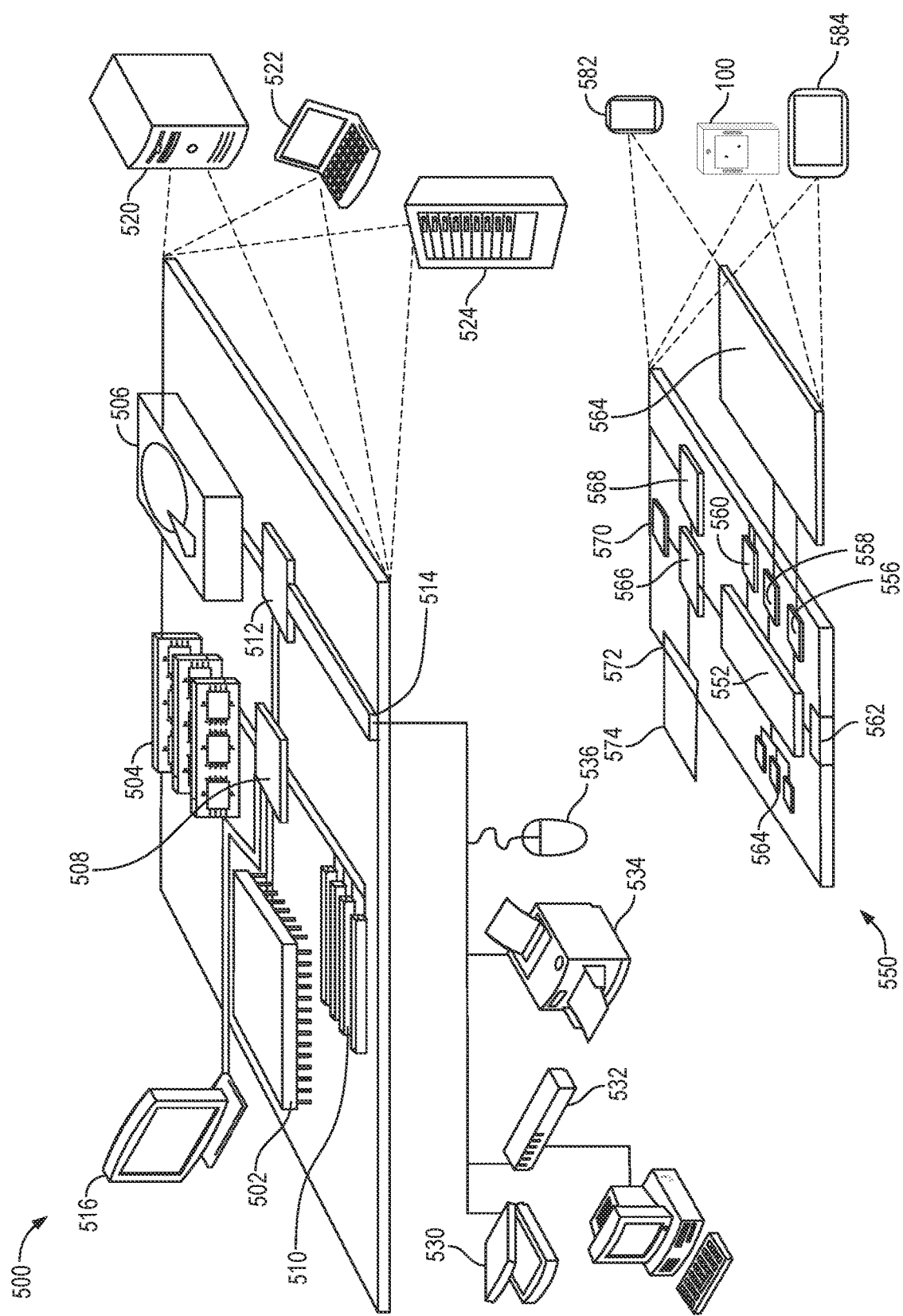
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing devices 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 can include appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550 and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for generating an iris identifier, the method comprising:
   capturing a first image of an iris;
   generating a plurality of images of the iris by processing the first image by multiple different filters that simulate various capture conditions;
   generating a binary code for each of the plurality of images of the iris, the binary code comprising a sequence of bits;
   identifying a first pattern of bits for which bit values and bit-locations are the same across a plurality of the binary codes;
   generating a first index based on the first pattern of bits by combining the first pattern of bits together with location information corresponding to the first pattern of bits; and
   storing the first index on a storage device in accordance with a database management system, the first index linked to biometric information of a different modality for a corresponding user.

2. The method of claim 1, wherein generating the binary code comprises filtering the plurality of images using a Gabor filter.

3. The method of claim 1, wherein the biometric information of the different modality comprises one of a facial image, a fingerprint image, or an eyeprint image.

4. The method of claim 1, further comprising:
   capturing at least one iris image from a user attempting to access a secure system;
   generating, from the at least one iris image, multiple binary codes;
   identifying a second pattern of bits in the binary codes for which bit values and bit-locations are the same across the multiple binary codes generated from the at least one iris image;
   generating a second index based on the second pattern of bits
   determining that the second index is substantially similar to the first index;
   responsive to determining that the second index is substantially similar to the first index, retrieving the biometric information of the different modality linked to the first index;
   obtaining, from the user attempting to access the secure system, biometric information of the different modality; and
   granting access to the secure system responsive to determining that the biometric information obtained from the user attempting to access the secure system is substantially the same as the biometric information of the different modality linked to the first index.

5. A system comprising:
   at least one processing device;
   a memory communicatively coupled to the at least one processing device, the memory storing instructions which, when executed, cause the at least one processing device to perform operations comprising:
   capturing a first image of an iris;
   generating a plurality of images of the iris by processing the first image by multiple different filters that simulate various capture conditions;
   generating a binary code for each of the plurality of images of the iris, the binary code comprising a sequence of bits;
   identifying a first pattern of bits for which bit values and bit-locations are the same across a plurality of the binary codes;
   generating a first index based on the first pattern of bits by combining the first pattern of bits together with location information corresponding to the first pattern of bits; and
   storing the first index on a storage device in accordance with a database management system, the first index linked to biometric information of a different modality for a corresponding user.

6. The system of claim 5, wherein generating the binary code comprises filtering the plurality of images using a Gabor filter.

7. The system of claim 5, wherein the biometric information of the different modality comprises one of a facial image, a fingerprint image, or an eyeprint image.

8. The system of claim 5, wherein the operations further comprise:
   capturing at least one iris image from a user attempting to access a secure system;
   generating, from the at least one iris image, multiple binary codes;
   identifying, a second pattern of bits in the binary codes for which bit values and bit-locations are the same across the multiple binary codes generated from the at least one iris image;
   generating a second index based on the second pattern of bits
   determining that the second index is substantially similar to the first index;
   responsive to determining that the second index is substantially similar to the first index, retrieving the biometric information of the different modality linked to the first index;
   obtaining, from the user attempting to access the secure system, biometric information of the different modality; and
   granting access to the secure system responsive to determining that the biometric information obtained from the user attempting to access the secure system is substantially the same as the biometric information of the different modality linked to the first index.

9. A non-transitory computer-readable medium having encoded thereon computer readable instructions that, when executed by for causing one or more processing devices, cause the one or more processing devices to perform operations comprising:
   capturing a first image of an iris;
   generating a plurality of images of the iris by processing the first image by multiple different filters that simulate various capture conditions;

generating a binary code for each of the plurality of images of the iris, the binary code comprising a sequence of bits;

identifying a first pattern of bits for which bit values and bit-locations are the same across a plurality of the binary codes;

generating a first index based on the first pattern of bits by combining the first pattern of bits together with location information corresponding to the first pattern of bits; and storing the first index on a storage device in accordance with a database management system, the first index linked to biometric information of a different modality for a corresponding user.

10. The non-transitory computer-readable medium of claim 9, wherein generating the binary code comprises filtering the plurality of images using a Gabor filter.

11. The non-transitory computer-readable medium of claim 9, wherein the biometric information of the different modality comprises one of a facial image, a fingerprint image, or an eyeprint image.

12. The non-transitory computer-readable medium of claim 9, wherein the operations further comprise:

capturing at least one iris image from a user attempting to access a secure system;

generating, from the at least one iris image, multiple binary codes;

identifying, a second pattern of bits in the binary codes for which bit values and bit-locations are the same across the multiple binary codes generated from the at least one iris image;

generating a second index based on the second pattern of bits determining that the second index is substantially similar to the first index;

responsive to determining that the second index is substantially similar to the first index, retrieving the biometric information of the different modality linked to the first index;

obtaining, from the user attempting to access the secure system, biometric information of the different modality; and granting access to the secure system responsive to determining that the biometric information obtained from the user attempting to access the secure system is substantially the same as the biometric information of the different modality linked to the first index.

\* \* \* \* \*